United States Patent
Aiton et al.

(10) Patent No.: US 7,788,930 B2
(45) Date of Patent: Sep. 7, 2010

(54) METHODS AND SYSTEMS FOR GAS MOISTURIZATION CONTROL

(75) Inventors: John Reuben Aiton, Simpsonville, SC (US); Michael Joseph Alexander, Simpsonville, SC (US); Matthew Charles Prater, Greer, SC (US); William Randolph Hurst, Easley, SC (US)

(73) Assignee: General Electric Company, Schenectady, NY (US)

( * ) Notice: Subject to any disclaimer, the term of this patent is extended or adjusted under 35 U.S.C. 154(b) by 139 days.

(21) Appl. No.: 11/743,016

(22) Filed: May 1, 2007

(65) Prior Publication Data

US 2008/0271460 A1    Nov. 6, 2008

(51) Int. Cl.
    F02C 3/30    (2006.01)
(52) U.S. Cl. .................. 60/775; 60/39.539; 60/39.59; 48/127.9
(58) Field of Classification Search .............. 60/39.3, 60/39.53, 39.55, 39.58, 39.59, 775, 39.182; 48/127.3, 127.9; 261/16
    See application file for complete search history.

(56) References Cited

U.S. PATENT DOCUMENTS

| 5,329,758 | A | * | 7/1994 | Urbach et al. ............... 60/775 |
| 5,595,059 | A | * | 1/1997 | Huber et al. ................. 60/780 |
| 6,295,838 | B1 | * | 10/2001 | Shah et al. ................... 62/643 |
| 6,341,486 | B2 | * | 1/2002 | Hannemann et al. ........ 60/39.12 |
| 6,370,880 | B1 | | 4/2002 | Smith et al. |
| 6,389,794 | B2 | | 5/2002 | Ranasinghe et al. |
| 6,478,289 | B1 | * | 11/2002 | Trewin ........................ 261/27 |
| 6,502,402 | B1 | | 1/2003 | Smith et al. |
| 6,694,744 | B1 | | 2/2004 | Smith |
| 2002/0107614 | A1 | * | 8/2002 | Tanaka ...................... 700/286 |

FOREIGN PATENT DOCUMENTS

GB    2015025 A  *  9/1979

* cited by examiner

*Primary Examiner*—Michael Cuff
*Assistant Examiner*—Phutthiwat Wongwian
(74) *Attorney, Agent, or Firm*—Armstrong Teasdale LLP

(57) ABSTRACT

Methods and systems for a gas moisturizing system are provided. The system includes a plurality of gas sources configured to supply a flow of gas to a plurality of gas loads, a single gas moisturizer coupled in flow communication to the plurality of gas sources and the plurality of gas loads wherein the single gas moisturizer is configured to supply a flow of gas having a predetermined moisture content to the plurality of gas loads, and a control system configured to maintain the predetermined moisture content.

10 Claims, 4 Drawing Sheets

METHODS AND SYSTEMS FOR GAS MOISTURIZATION CONTROL

BACKGROUND OF THE INVENTION

This invention relates generally to combined cycle generation systems, and more specifically to methods and systems for controlling moisture content in a gas stream of a combined cycle generation system.

At least some known combined cycle generation systems include a moisturization sub-system that is configured to add a moisturizing fluid to a relatively dry flow of gas. Typically, the gas comprises a carboneous or hydrogen-based fuel gas and the moisturizing fluid tends to be water or steam. Generally, a moisturization tower or saturator is positioned in-line between a process gas train supplying the fuel gas to a gas turbine. It is a relatively simple task to control moisture in a gas stream between a single gas source and a single gas load; however, other configurations may provide a cost savings in materials and operating expenses. The gas supplied to the gas loads must still meet predetermined specifications when using other configurations of gas sources, moisturizers, and gas loads. Simple moisture control methods may be inadequate for all operating conditions of these configurations, for example, during a startup, a shutdown, or a transient involving one or more gas sources and/or supplies.

What is needed is a control system configured to control moisture in a gas stream of a system that includes one or more moisturizers from a plurality of gas sources to a plurality of gas loads, and to control heat input from a plurality of heat sources.

BRIEF DESCRIPTION OF THE INVENTION

In one embodiment, a moisturizing system includes a plurality of gas sources configured to supply a flow of gas to a plurality of gas loads and a single gas moisturizer coupled in flow communication to the plurality of gas sources and the plurality of gas loads. The single gas moisturizer is configured to supply a flow of gas with predetermined moisture content to the plurality of gas loads, and a control system is configured to maintain the predetermined moisture content.

In another embodiment, a method of controlling moisture in a gas stream supply system using a moisturizer includes determining a target moisturizer outlet temperature corresponding to a predetermined target moisture content in the moisturizer outlet and predicting a target temperature of a moisturizer water inlet corresponding to the determined target moisturizer outlet temperature using a feed forward control based on a heat balance of the moisturizer. The method also includes a feedback control that determines the difference between the target moisturizer outlet temperature and the actual moisturizer outlet temperature and, using a feedback controller, corrects the target temperature of the moisturizer water inlet that is calculated by the feed forward control.

In yet another embodiment, a method of controlling moisture in a gas moisturizer system includes determining a target moisturizer outlet temperature corresponding to a predetermined target moisture content in the moisturizer outlet and predicting a moisturizer water inlet temperature to achieve a predetermined exiting gas moisture content using a heat balance of the moisturizer. The predicted temperature is corrected by a feedback controller that acts the difference between the actual moisturizer outlet temperature and the outlet temperature corresponding to the predetermined moisture content. The inlet water temperature is controlled to the corrected target using a first and a second heat source and the water-to-gas ratio is modified as necessary to increase heat input into the moisturizer from the first heat source when the second heat source reaches a heat input limit. In this embodiment, the increase in water-to-gas ratio results in an adjustment to the target water temperature such that, when excess heat transfer capability is designed into the first heat source, the heat transfer requirement for the second heat source is reduced.

DETAILED DESCRIPTION OF THE INVENTION

Figure 1:
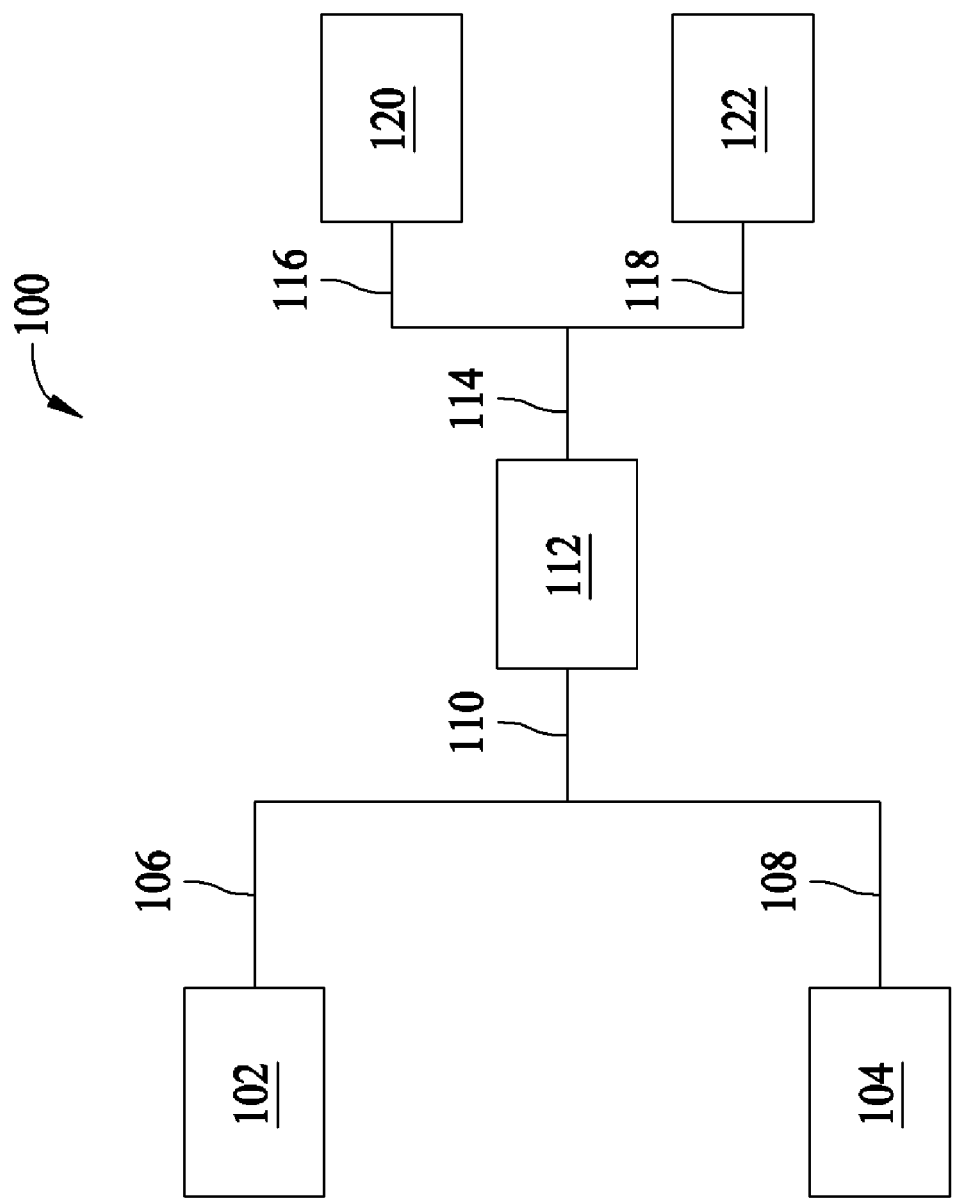
FIG. 1 is a schematic diagram of a portion of an exemplary combined-cycle power generation system.

FIG. 1 is a schematic diagram of a portion of an exemplary combined-cycle power generation system 100, for example, an integrated gasification combined-cycle (IGCC) power generation system. System 100 generally includes a plurality of gas sources 102, 104 such as a gasification system, which each generates a flow of relatively dry syngas. Although system 100 is illustrated in FIG. 1 with only two gas sources 102 and 104, any number of gas sources can be included in alternative embodiments. The syngas generated in each of gas sources 102 and 104 is channeled through respective conduits 106 and 108 to a common header 110 and to a single gas moisturizer subsystem 112. In alternative embodiments other combinations of gas sources and moisturizers are utilized. For example, in one embodiment, three gas sources are coupled in flow communication to two moisturizers. In another exemplary embodiment, five gas sources are coupled in flow communication to three moisturizers. Moisturized syngas is channeled from moisturizer subsystem 112 through a common header 114 to an inlet 116 and 118 to respective gas turbine engines 120 and 122. In other embodiments, moisturizer subsystem 112 supplies moisturized syngas to other combinations of gas turbine engines.

Figure 2:
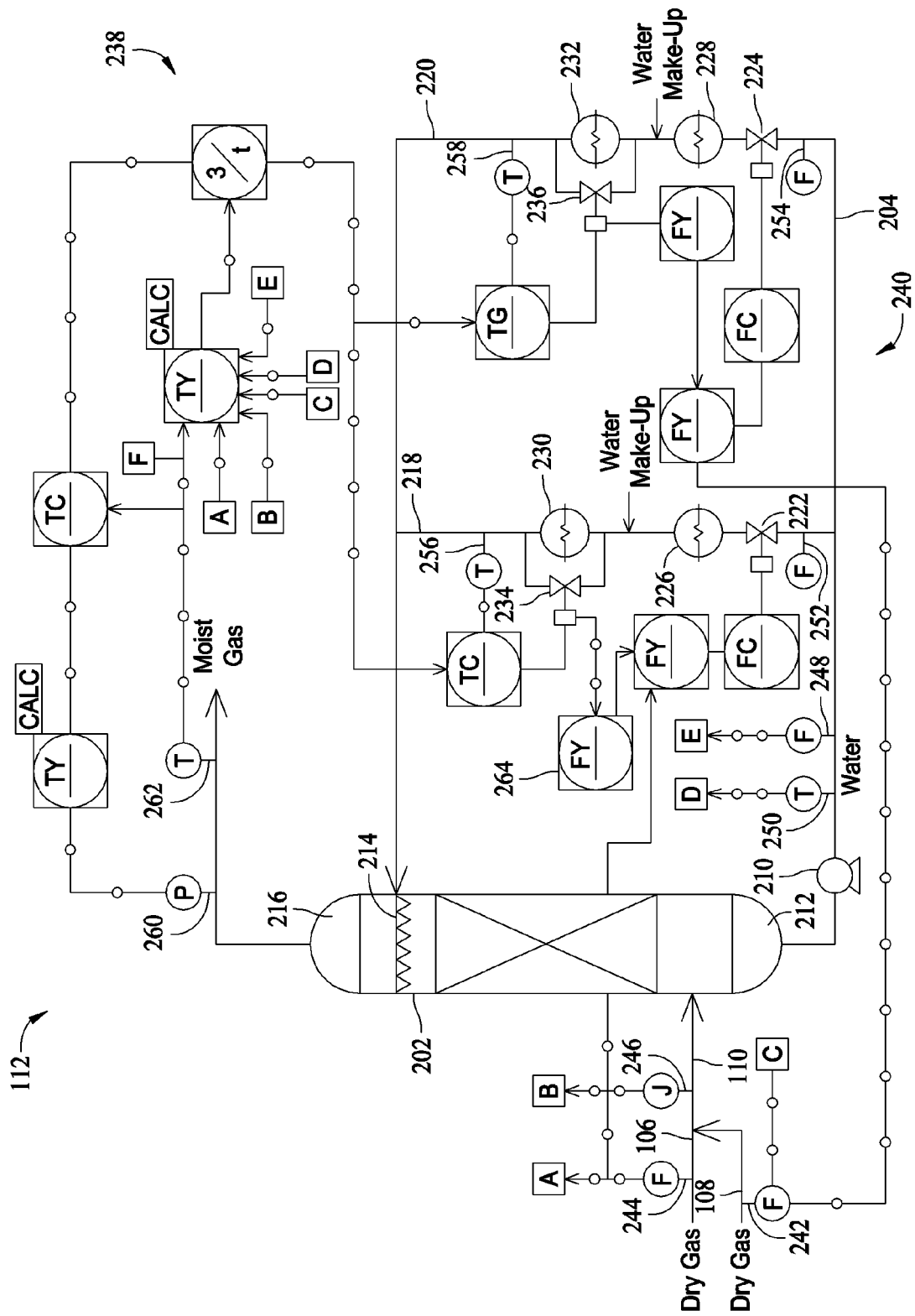
FIG. 2 is a schematic diagram of an exemplary embodiment of moisturizer subsystem shown in FIG. 1.

FIG. 2 is a schematic diagram of an exemplary embodiment of moisturizer subsystem 112 (shown in FIG. 1). In the exemplary embodiment, moisturizer subsystem 112 includes a moisturizer tower 202, a water recirculation subsystem 204, a dry gas inlet 206 and a moist gas outlet 208. Water recirculation subsystem 204 includes a recirculation pump 210 that takes suction from the tower bottoms 212 and discharges the heated water to a liquid distributor 214 located in tower overhead 216. Bottoms water is channeled through one or more heating legs 218 and 220 of recirculation subsystem 204. Each leg includes a flow control valve 222 and 224 respectively, a first heat exchanger 226 and 228, a second heat exchanger 230 and 232, and a bypass valve 234 and 236. Although described herein as heat exchangers, first heat exchangers 226 and 228 and second heat exchangers 230 and 232 may instead be embodied in heaters, for example, but not limited to electric heaters and/or fueled heaters. or may be a combination of heaters and heat exchangers.

Moisturizer subsystem 112 includes a temperature control subsystem 238 and a water-to-gas ratio control sub-system 240. In the exemplary embodiment, temperature control subsystem 238 receives inputs from dry gas flow 242 and 244 and temperature 246, bottoms water flow 248 and temperature 250, recirculation flow 252 and 254, and a pressure 260 and temperature 262 of the moist gas outlet from moisturizer tower 202, also referred to herein as overhead pressure and overhead temperature. Water-to-gas ratio control sub-system 240 receives inputs from dry gas flow 242 and 244 and a valve position indication 264 and 266 from each of bypass valves 234 and 236, respectively.

During operation, a dry gas is moisturized with water by contacting the gas and water on a series of equilibrium stages inside a pressurized column such as moisturizer tower 202. Several factors influence the degree of gas moisturization as it exits moisturizer tower 202. These factors include tower pressure, gas and water inlet temperatures, the water-to-gas flow ratio, and the dry gas composition entering moisturizer tower 202.

Accurate control of moisture content in a non-condensable gas may be required to achieve acceptable design characteristics in equipment using the gas. Dry gas feed streams from two or more independent production units, for example, gasification systems, are combined and moisturized by a single moisturizer tower 202. The moisturized gas is then split and fed to downstream consumption units or gas loads. The water specification of the moisturized gas is maintained within close tolerances, for example, ±1.0 mole % of a predetermined target during transients in either the upstream or downstream unit operations. The system is also capable of controlling moisture during periods of limited heat availability.

Temperature control subsystem 238 anticipates changes in overhead moisture as feed conditions change, and it properly adjusts recirculation water return temperature to the top of moisturizer tower 202. If needed, the control strategy increases the water-to-gas ratio to minimize moisture variance. Such operation enables a single moisturizer tower 202 to moisturize two or more independent gas feed streams and to feed two or more independent downstream unit operations. Feedback-only control strategies may respond too slowly to enable close moisture control tolerances in rapidly changing operating conditions. Temperature control subsystem 238 and a water-to-gas ratio control sub-system 240 couples the control of water temperature and the water-to-gas flow ratio to enable acceptable moisture control during all periods of operation.

Figure 3:
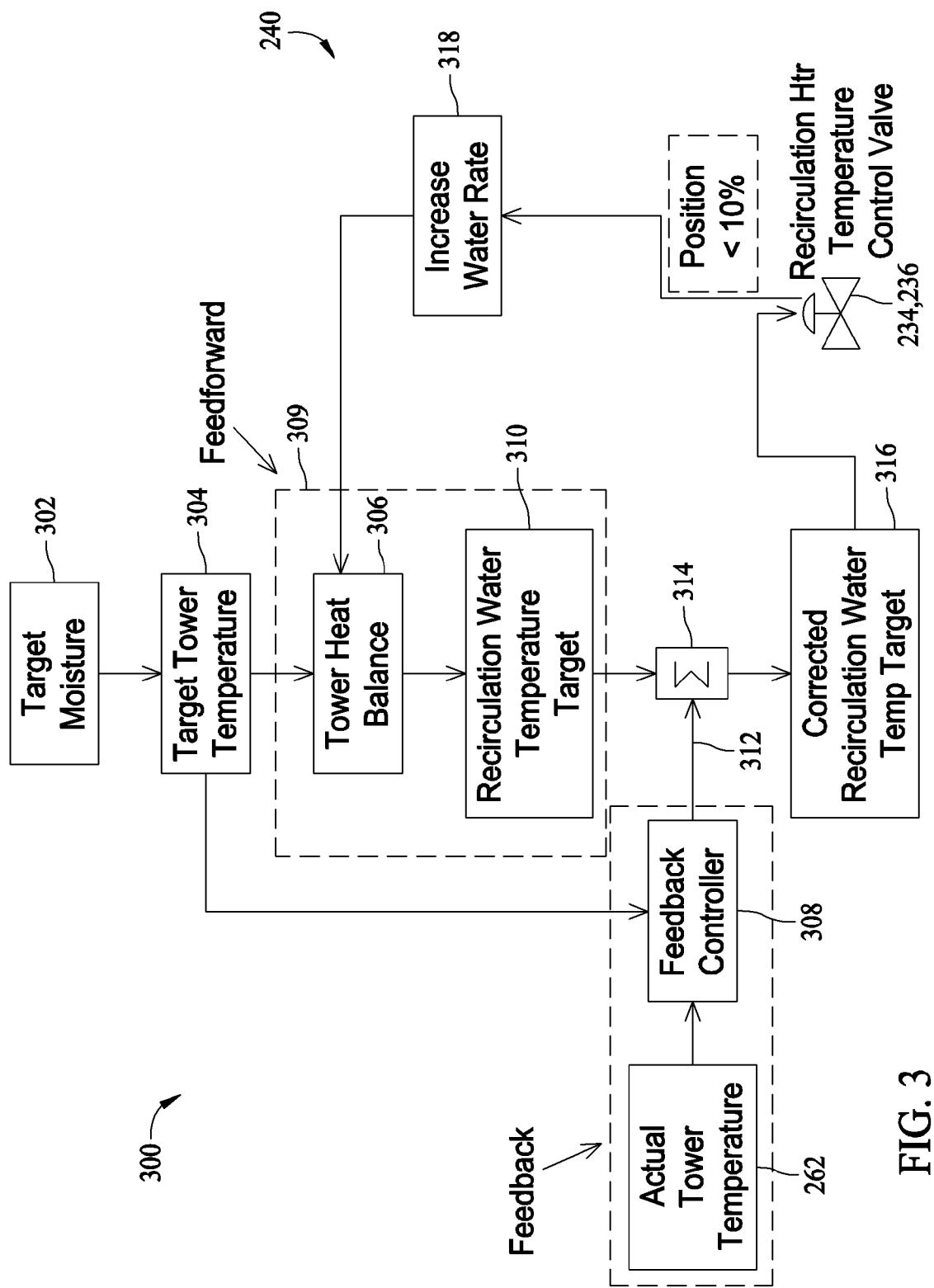
FIG. 3 is a schematic block flow diagram of an exemplary embodiment of temperature control subsystem and a water-to-gas ratio control sub-system shown in FIG. 2.

FIG. 3 is a schematic block data flow diagram 300 of an exemplary embodiment of temperature control subsystem 238 and a water-to-gas ratio control sub-system 240 (shown in FIG. 2).

In the exemplary embodiment, a target moisture value 302 is specified for the outlet of moisturizer tower 202. Target moisture value 302 is used to determine a target tower temperature 304. The moisture in the moisturized gas exiting moisturizer tower 202 is determined by the overhead pressure and overhead temperature in moisturizer tower 202. In one embodiment a correlation curve of target moisture to tower temperature is used to determine target tower temperature 304. The determined target tower temperature 304 is transmitted to a tower heat balance calculation 306 and a feedback controller 308. Tower heat balance 306 calculates a feedforward control portion 309 of temperature control subsystem 238. Tower heat balance 306 uses a determinable relationship between a plurality of inputs to predict the output to a controlled parameter to achieve the desired control response quickly. A feedback control portion uses the actual measured temperature 262 to adjust the control parameter to accurately maintain temperature 262 at target tower temperature 304.

Tower heat balance 306 determines a recirculation water temperature target 310 from inputs including dry gas flow 242 and 244 and temperature 246, bottoms temperature 250, recirculation water flow 252 and 254, and the current exiting gas moisture content predicted using pressure 260 and temperature 262.

Tower heat balance 306 uses the temperature, flow, and pressure inputs to determine the recirculation water temperature target 310. In the exemplary embodiment, at equilibrium conditions in moisturizer tower 202, the heat rate flowing into moisturizer tower 202 is equal to the heat rate flowing out of moisturizer tower 202, $$\dot{Q}_{IN} = \dot{Q}_{OUT}, \text{ where} \quad (1)$$

$\dot{Q}_{IN}$ represents the rate of heat entering moisturizer tower 202, $\dot{Q}_{OUT}$ represents the rate of heat exiting moisturizer tower 202.

$\dot{Q}_{IN}$ may be expressed as a sum of the sources of heat input into moisturizer tower 202:

$$\dot{Q}_{IN} = \dot{m}_g C_{Pg} T_g + \dot{m}_{H_2O} C_{PH_2O} T_{H_2O}, \text{ where} \quad (2)$$

$\dot{m}_g C_{Pg} T_g$ represents the heat input from the flow of relatively dry gas entering moisturizer tower 202, $\dot{m}_g$ represents the dry gas flow, $C_{Pg}$ is the specific heat capacity of the dry gas, and $T_g$ represents the temperature of the gas; $\dot{m}_{H_2O} C_{PH_2O} T_{H_2O}$ represents the heat input from the flow of recirculation water entering moisturizer tower 202, $\dot{m}_{H_2O}$ represents the recirculation water flow, $C_{PH_2O}$ is the specific heat capacity of the recirculation water, and $T_{H_2O}$ represents the temperature of the recirculation water. The recirculation water flow measurement is taken after any make-up water is added to the recirculation water loop.

$\dot{Q}_{OUT}$ may be expressed as a sum of the sources of heat exiting moisturizer tower 202:

$$\dot{Q}_{OUT} = \dot{m}_{OH} C_{POH} T_{OH} + \dot{m}_B C_{PB} T_B, \text{ where} \quad (3)$$

$\dot{m}_{OH} C_{POH} T_{OH}$ represents the heat exiting due to the flow of moist gas exiting moisturizer tower 202, $\dot{m}_{OH}$ represents the moist gas flow, $C_{POH}$ is the specific heat capacity of the moist gas, and $T_{OH}$ represents the temperature of the moist gas; $\dot{m}_B C_{PB} T_B$ represents the heat in the water leaving tower bottoms 212. $\dot{m}_B$ represents the bottoms flow leaving the tower, $C_{PB}$ is the specific heat capacity of the bottoms water, and $T_B$ represents the temperature of the bottoms water.

The terms for $\dot{Q}_{IN}$ from equation (2) and $\dot{Q}_{OUT}$ from equation (3) are substituted into equation (1):

$$\dot{m}_g C_{Pg} T_g + \dot{m}_{H_2O} C_{PH_2O} T_{H_2O} = \dot{m}_{OH} C_{OH} T_{OH} + \dot{m}_B C_{PB} T_B \quad (4)$$

Equation (4) is then solved for $T_{H_2O}$, which is the temperature of the recirculation water entering moisturizer tower 202 and is the parameter that is controlled by temperature control subsystem 238.

$$T_{H_2O} = \frac{\dot{m}_g C_{POH} T_{OH}}{\dot{m}_{H_2O} C_{PH_2O} (1 - \text{Target})} + \frac{\dot{m}_B}{\dot{m}_{H_2O}} \frac{C_{PB}}{C_{PH_2O}} T_B - \frac{\dot{m}_g}{\dot{m}_{H_2O}} \frac{C_{Pg}}{C_{PH_2O}} T_g \quad (5)$$

$T_{H_2O}$ is the recirculation water temperature target 310 shown in FIG. 3. The determined recirculation water temperature target 310 is combined with an output 312 of feedback controller 308 in a summing function 314 to determine a corrected recirculation water temperature target 316. Corrected recirculation water temperature target 316 is used to control recirculation bypass valves 234 and 236 to maintain temperature 262 at approximately the determined target tower temperature 304. During periods of low heat availability, or other transient conditions, recirculation bypass valves 234 and 236 may be commanded to close to extract a greater amount of heat from heat exchangers 230 and 232. With limited heat availability, recirculation bypass valves 234 and 236 could reach an end of travel in the closed direction such that temperature control could be lost. However, in various embodiments of the present invention, the position of recirculation bypass valves 234 and 236 are monitored such that travel past a predetermined position, for example, 10% stroke transmits an increase water rate signal 318 to ramp the water-to-gas ratio. Increasing the water-to-gas ratio decreases the recirculation water temperature requirement as calculated by the feedforward heat balance 306. If the first of the two heat sources 226 and 228 has been oversized and has excess heat transfer capacity, increasing the recirculation water flow and decreasing the temperature requirement tends to open recirculation bypass valves 234 and 236 and positions the recirculation bypass valves 234 and 236 in a more controllable span of the valves.

Figure 4:
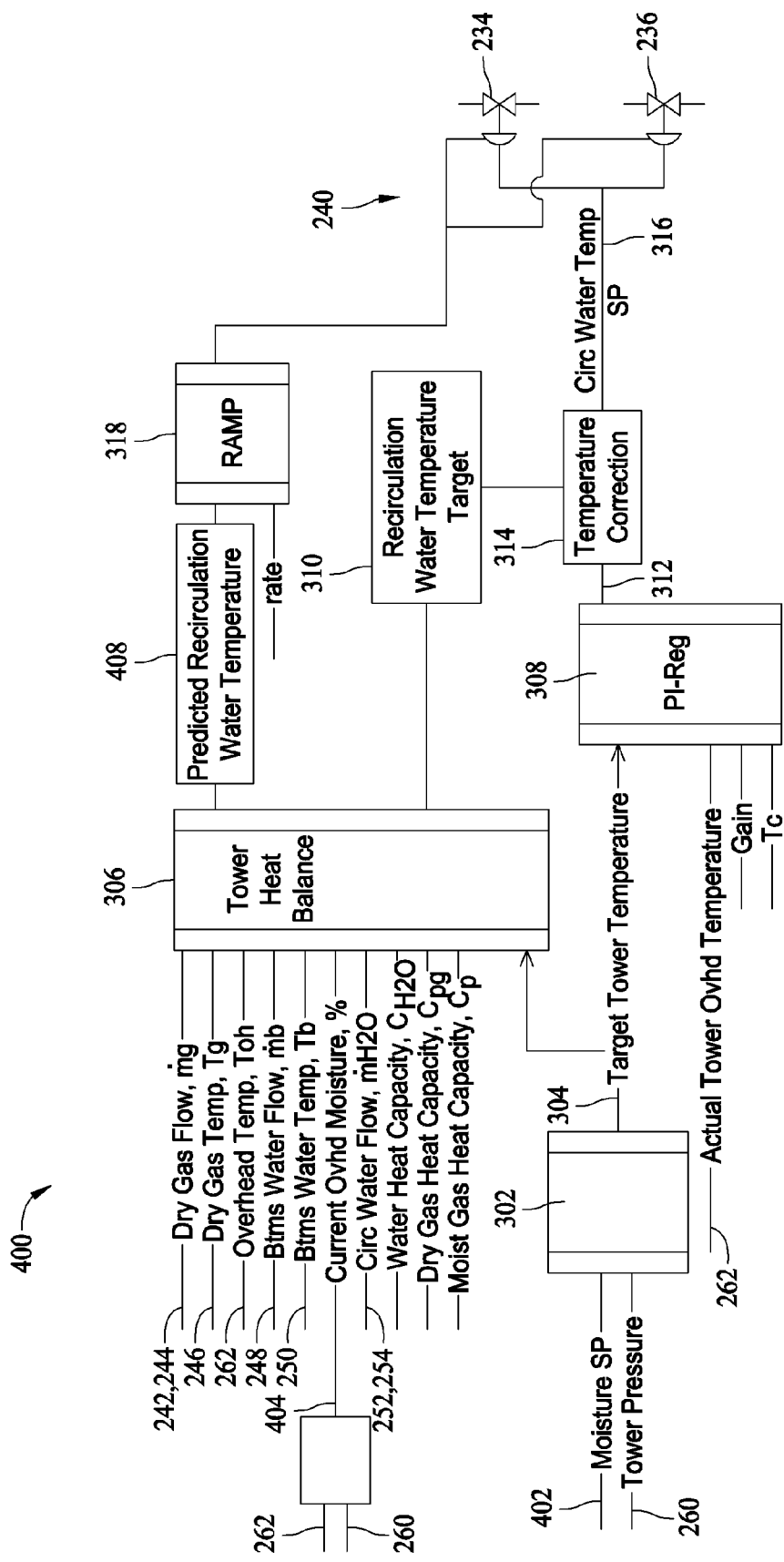
FIG. 4 is a control diagram of an exemplary embodiment of temperature control subsystem and a water-to-gas ratio control sub-system shown in FIG. 2.

FIG. 4 is a control diagram 400 and 401 of an exemplary embodiment of temperature control subsystem 238 and a water-to-gas ratio control sub-system 240 (shown in FIG. 2). In the exemplary embodiment, target tower temperature is generated using inputs from, for example, a selectable moisture setpoint 402 and a current pressure 260 in moisturizer tower 202. Target tower temperature 304 is transmitted to tower heat balance 306 and feedback controller 308. Tower heat balance uses target tower temperature 304, dry gas flows 242 and 244, dry gas temperature 246, bottoms water flow 248, bottoms water temperature 250, recirculation water flows 252 and 254, moist gas outlet pressure 260, and moist gas outlet temperature 262. A current moisture input 404, expressed as a mole percentage, is generated by looking at tower overhead temperature 262 and tower overhead pressure 260 and is converted to a moisture content using a correlation.

Tower heat balance 306 generates recirculation water target temperature 310 that is corrected to recirculation water target temperature 316 by combining recirculation water target temperature 310 with temperature feedback correction 312. To prevent control upsets during rapid changes in any of the heat balance inputs, predicted temperature 310 is ramped to its predicted value using Ramper 406. Corrected recirculation water target temperature 316 is used to control the position of bypass valves 234 and 236. If the position of bypass valves 234 or 236 in Control Diagram 401 reaches a predetermined position limit, for example, 10% open, a comparator 318, a clamp 319, and a multiplier 320 generates a water-to-gas ratio bias that is ramped to its final value and added to the base water-to-gas ratio. This incremented ratio is applied to the leg whose valve output dropped below the threshold limit. Using the dry gas rate 242 and 244, the required water setpoint is sent to flow valves 222 and 224. The incremented water-to-gas ratio feeds into tower heat balance 306 such that recirculation water target temperature 310 is reduced. This permits bypass valves 234 and 236 to control to a lower target temperature so bypass valves 234 and 236 open to a position greater than the predetermined position limit. Proper initialization of the control logic to prevent controller windup is required through blocks 410 and 412.

The above-described gas moisturizing systems and methods are cost-effective and highly reliable. The method permits moisture control with close tolerances for a plurality of gas loads during transients and steady state conditions. The systems and methods ensure that accurate moisture control is maintained by providing a predictive feedforward element and by providing control based on water temperature and water-to-gas ratio. The systems and methods enable one moisturization column to moisturize two independent gas streams supplying two independent gas turbines. Accordingly, the systems and methods described herein facilitate the operation of combined cycle systems in a cost-effective and reliable manner.

While the invention has been described in terms of various specific embodiments, those skilled in the art will recognize that the invention can be practiced with modification within the spirit and scope of the claims.

What is claimed is:

1. A moisturizing system comprising:
    a plurality of syngas sources configured to supply a flow of syngas to a plurality of gas loads;
    a single gas moisturizer coupled in flow communication to said plurality of syngas sources and to said plurality of gas loads, said single moisturizer comprising a recirculation sub-system having a recirculation water, said single gas moisturizer configured to supply a flow of syngas having a predetermined moisture content to the plurality of gas loads;
    a plurality of heat sources configured to add energy to an amount of recirculation water; and
    a control system configured to adjust a water-to-gas ratio entering said gas moisturizer based on a recirculation water temperature to maintain the predetermined moisture content.

2. A system in accordance with claim 1 wherein said recirculation sub-system comprises a pump, a first heat exchanger, and a second heat exchanger in serial flow communication.

3. A system in accordance with claim 2 wherein said first heat exchanger, and said second heat exchanger comprise a gas flow path and a non-contacting moisturizing fluid flow path.

4. A system in accordance with claim 3 wherein said first heat exchanger is downstream of said second heat exchanger with respect to the gas flow path.

5. A system in accordance with claim 3 wherein said second heat exchanger is downstream of said first heat exchanger with respect to the moisturizing fluid flow path.

6. A system in accordance with claim 3 wherein an outlet temperature of the moisturizing fluid flow from said second heat exchanger is determined by bypassing a quantity of the moisturizing fluid flow around the second heat exchanger.

7. A system in accordance with claim 6 wherein the flow rate of moisturizing fluid flow bypassing the second heat exchanger is controlled by a bypass valve.

8. A system in accordance with claim 6 wherein a position of said bypass valve is determined by said control system to maintain the predetermined moisture content.

9. A system in accordance with claim 1 wherein said control system comprises feed forward feedback control.

10. A system in accordance with claim 1 wherein said control system is configured to increment the predetermined moisture content.

* * * * *